UNITED STATES PATENT OFFICE.

MAX HESSBERG, OF LONDON, ENGLAND.

BREWING.

1,146,793.  Specification of Letters Patent.  Patented July 20, 1915.

No Drawing. Application filed May 7, 1913. Serial No. 766,089.

*To all whom it may concern:*

Be it known that I, MAX HESSBERG, a citizen of the German Empire, and residing at London, England, have invented certain new and useful Improvements in Brewing, of which the following is a specification.

My invention relates to improvements in and relating to brewing, and a primary object is to extract the bittering from the residue or dregs from the cooler mixed with the spent hops, which residue has hitherto been regarded as worthless. To this end, I "mash" the mixture of cooler residue or dregs and spent hops over again with the succeeding brew. In this manner not only is the bittering contained in the spent hops completely utilized, but the bittering and hop resins separated out in the residue or dregs by the precipitation of albumens are again extracted.

My process can be carried out to particular advantage if the raw hops are ground to a fine powder in a hop mill before being mashed. After the usual boiling, the wort is turned out from the hop copper, without a hop strainer being used, together with the spent hops, direct onto the cooler. The cooler residue or dregs and spent hops remaining behind in the press are boiled with the mash in the succeeding brew in the mash copper and, when this mixture is pumped back to the remaining mash in the mash-tun, are mixed with the new brew and so thoroughly utilized.

The technical advance effected by the present invention lies in the complete utilization not only of the spent hops but also of the bittering contained in the albuminous residue left by the preceding brew, which has hitherto been lost, so that a saving in hops of about 25% of the quantity hitherto employed, or more, is effected, apart from the saving of some 20% effected by using a hop mill, which is of particular advantage for the present process. Moreover, by employing my process I save the wort which remains in the residue and amounts for every 30 hundredweights of malt grist used to about half a hectoliter. Lastly, the new process possesses a new economic value, for the nutritive value of the grains is considerably increased by the addition of the albuminous residue from the cooler.

When a hop mill is not used, the cooler residue from the press or strainers can be used either alone or with the spent hops, as mentioned above, to be mashed again in the succeeding brew. The utilization of the residue will, however, not be so complete in this case.

My process can be applied to various systems of brewing, but to make the invention better understood its mode of application to one particular system, viz. the decoction system, will now be explained. As is well known, in the so-called decoction system of brewing the malt is first of all mashed with cold water in the mash-tun, after which hot water is admitted to the mash-tun from a separate vessel called the mash copper; a portion of the warmed mash is then run off to the mash copper, in which it is boiled, after which it is returned to the mash-tun. This latter process is repeated two or three times until the mash is raised to the desired temperature after which the solid particles are allowed to settle and the clear mash is run off into another vessel where it is further cleared and passes thence to the beer copper where it is brewed with the hops. From the beer copper it passes to the cooler where the residue or dregs are collected.

In applying my invention to the above system I effect the remashing of the cooler residue or dregs either in the mash copper or in the mash-tun or in the vessel containing the clear mash (*Läuterbottich*) or in the beer copper. If desired, however, I may boil the cooler residue or dregs with water or with the wort either in an open vessel or under pressure in a closed vessel, and add the same to a succeeding brew.

I claim:—

1. A process of extracting the bittering and hop resins from the cooler residue or dregs obtained from one brew, consisting in mashing the said residue or dregs in the succeeding brew.

2. A process of extracting the bittering and hop resins from the cooler residue or dregs obtained from one brew, consisting in mashing the said residue or dregs with the spent hops in the succeeding brew.

3. A process of extracting the bittering and hop resins from the cooler residue or dregs obtained from one brew, consisting in mashing the said residue or dregs in the mash copper during the succeeding brew.

In testimony whereof, I affix my signature in the presence of two witnesses, at Berlin, Germany, this 19th day of April, 1913.

MAX HESSBERG.

Witnesses:
 WOLDEMAR HAUPT,
 HENRY HASPER.

Copies of this patent may be obtained for five cents each, by addressing the "Commissioner of Patents, Washington, D. C."